United States Patent
Shaw

(10) Patent No.: US 7,665,766 B2
(45) Date of Patent: Feb. 23, 2010

(54) ALL TERRAIN VEHICLE (ATV) SAFETY ATTACHMENT WITH GAS TANK HOLDER

(76) Inventor: Mark William Shaw, 3740 Pinewood Ave., Prince George, British Columbia (CA) V2M 4J4

( * ) Notice: Subject to any disclaimer, the term of this patent is extended or adjusted under 35 U.S.C. 154(b) by 312 days.

(21) Appl. No.: 11/881,765

(22) Filed: Jul. 30, 2007

(65) Prior Publication Data

US 2008/0042417 A1    Feb. 21, 2008

Related U.S. Application Data

(60) Provisional application No. 60/838,111, filed on Aug. 17, 2006.

(51) Int. Cl.
*B62D 49/08* (2006.01)

(52) U.S. Cl. ............... 280/755; 180/311

(58) Field of Classification Search ............... 280/755; 180/311, 312, 208; 296/26.08
See application file for complete search history.

(56) References Cited

U.S. PATENT DOCUMENTS

| | | | |
|---|---|---|---|
| 5,765,871 A * | 6/1998 | Wyman et al. | 280/827 |
| 5,941,327 A * | 8/1999 | Wu | 180/65.1 |
| 6,336,517 B1 * | 1/2002 | Cheng | 180/208 |
| 6,439,331 B1 * | 8/2002 | Fan | 180/208 |
| 6,655,717 B1 * | 12/2003 | Wang | 280/781 |
| 6,851,711 B2 * | 2/2005 | Goertzen et al. | 280/755 |
| 6,991,277 B1 * | 1/2006 | Esler | 296/50 |
| 7,044,249 B2 * | 5/2006 | Fan | 180/208 |
| 7,070,220 B1 * | 7/2006 | Lantaigne | 296/26.08 |

* cited by examiner

*Primary Examiner*—Paul N Dickson
*Assistant Examiner*—Nicole Verley

(57) ABSTRACT

A Safety Attachment which does not allow the All Terrain Vehicles front end to lift off the ground more than a specified distance and eliminate a backwards overturn, when such vehicles are driven by one or more people up an incline of sufficient grade so as to cause the lighter-weighted front end of the vehicle to lift off the ground. There is also an adjustment on the safety attachment to give the invention further clearance from the ground to suit the more rugged terrain but enough clearance so the front end lifts up only within a safe determined distance. This invention, which consists of; 2 frames that are hinged together on the top and an adjustment on the bottom, one side attaches permanently to the back end of the ATV, the other side attaches to a removal safety device which is secured in place by locking pins and within this safety device a gasoline container can be housed. The main advantages of this Invention are; in the design of the safety device which limits how far the front end of the ATV can lift off the ground and also in the adjustability of the frame that attaches to the ATV.

18 Claims, 12 Drawing Sheets

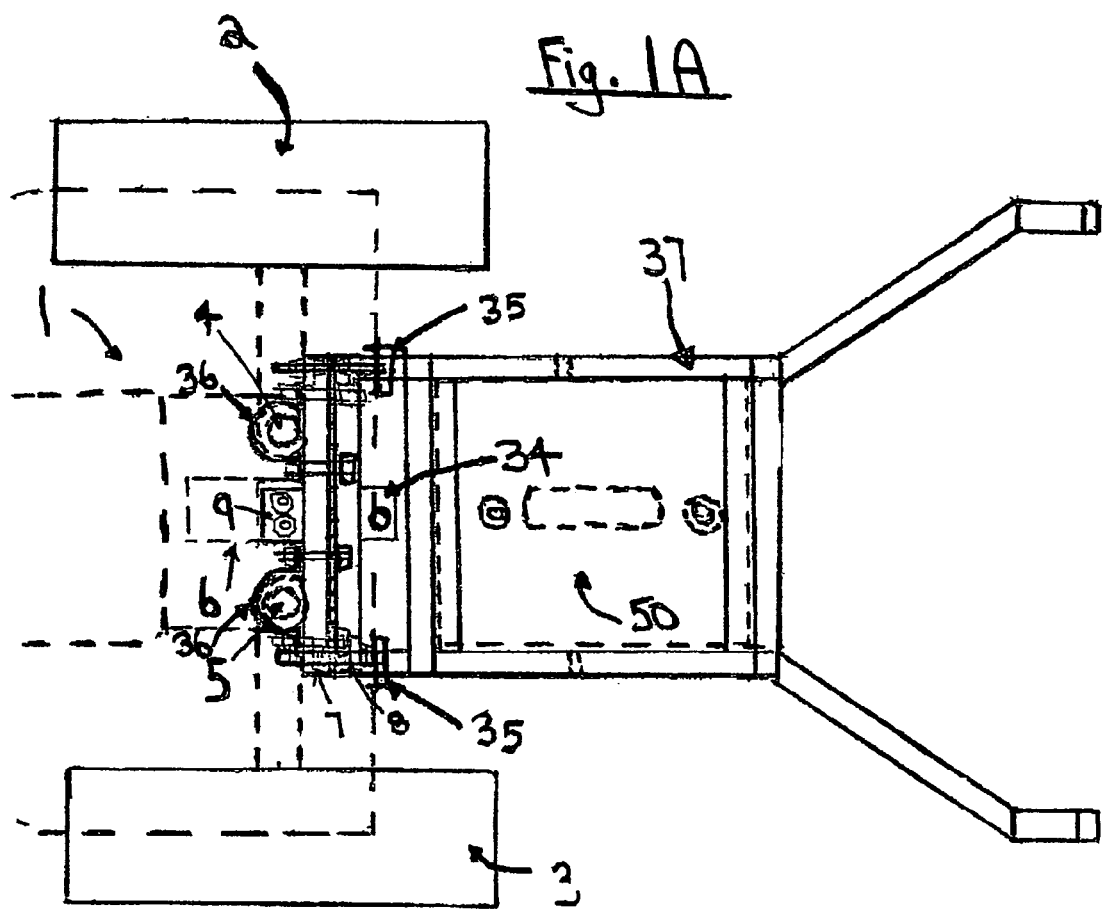

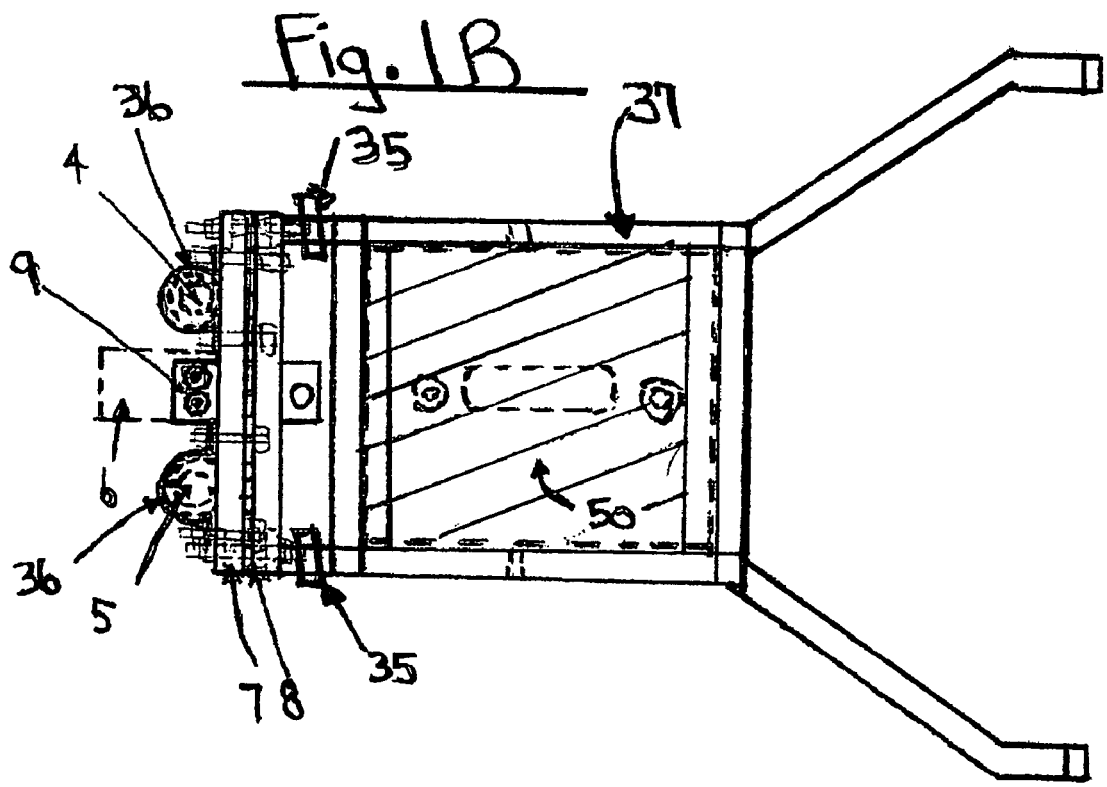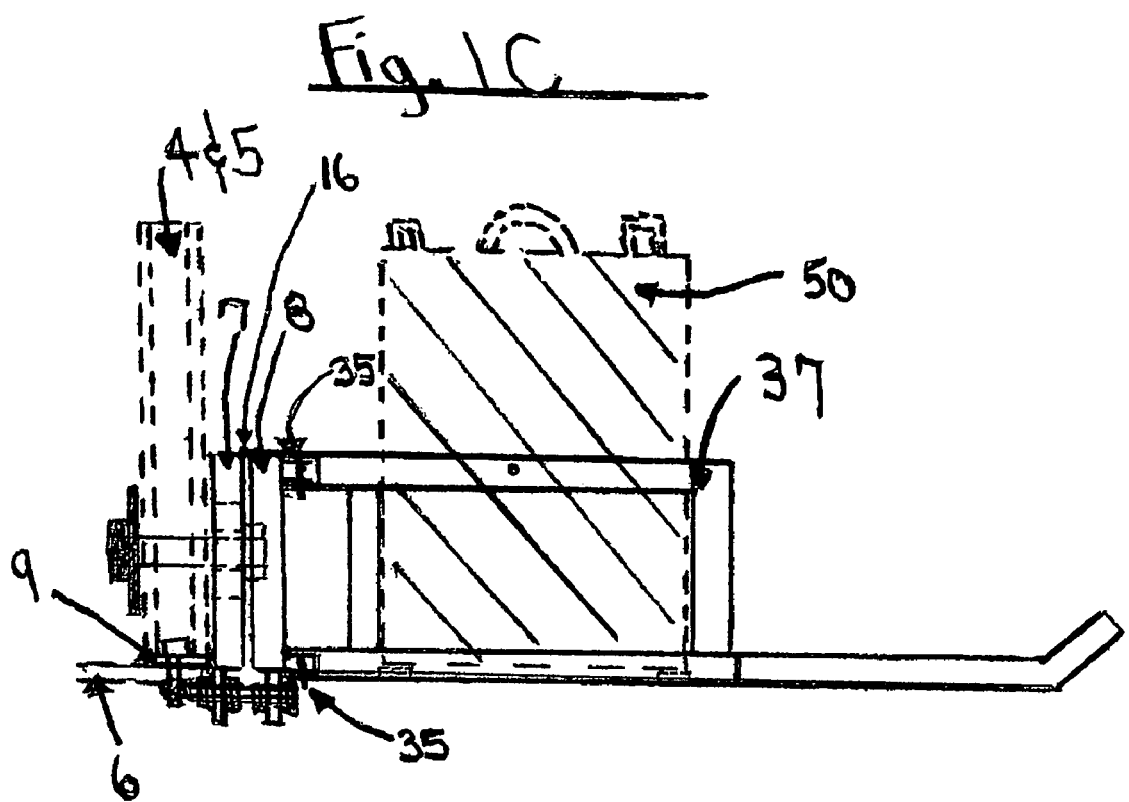

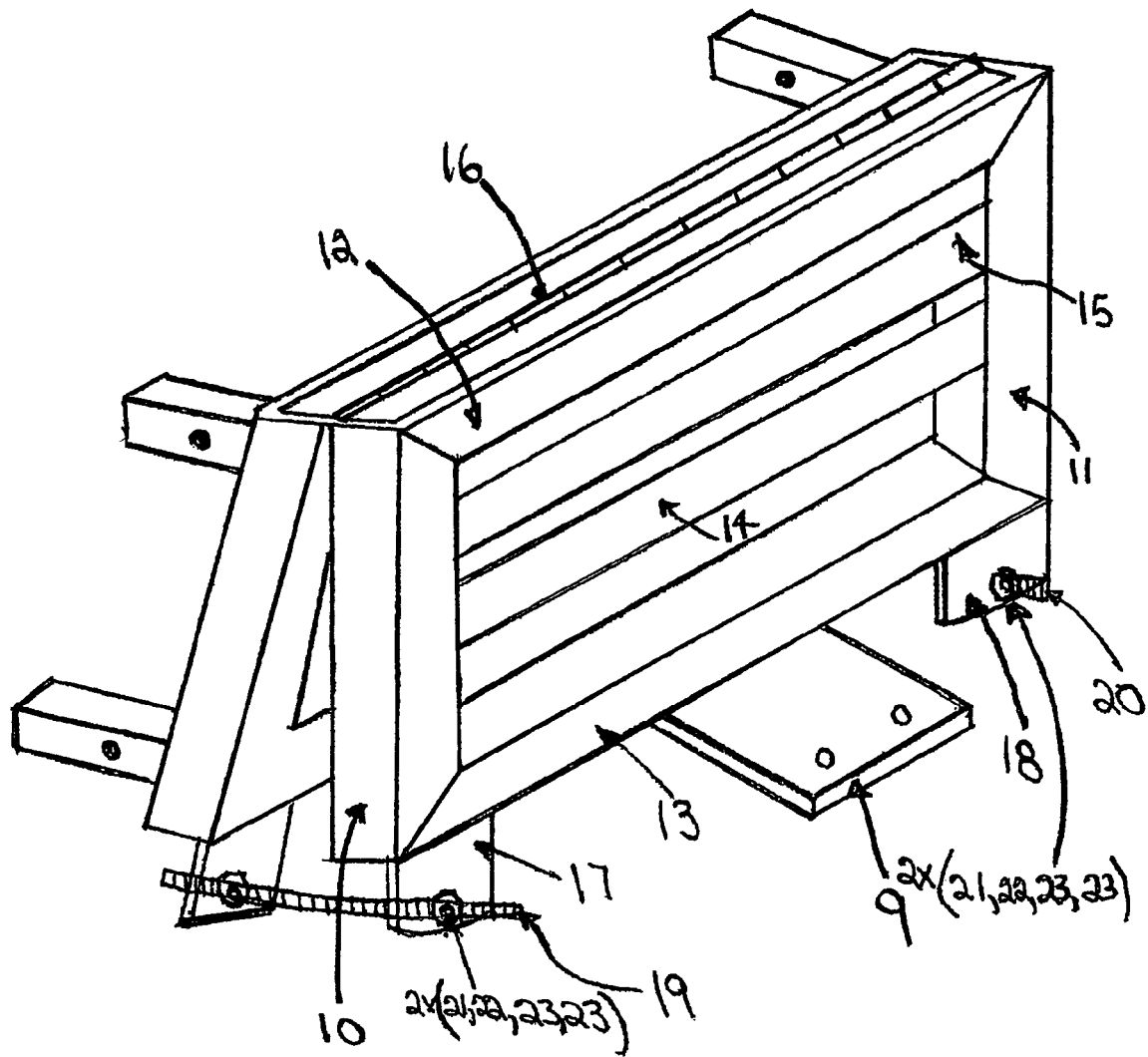

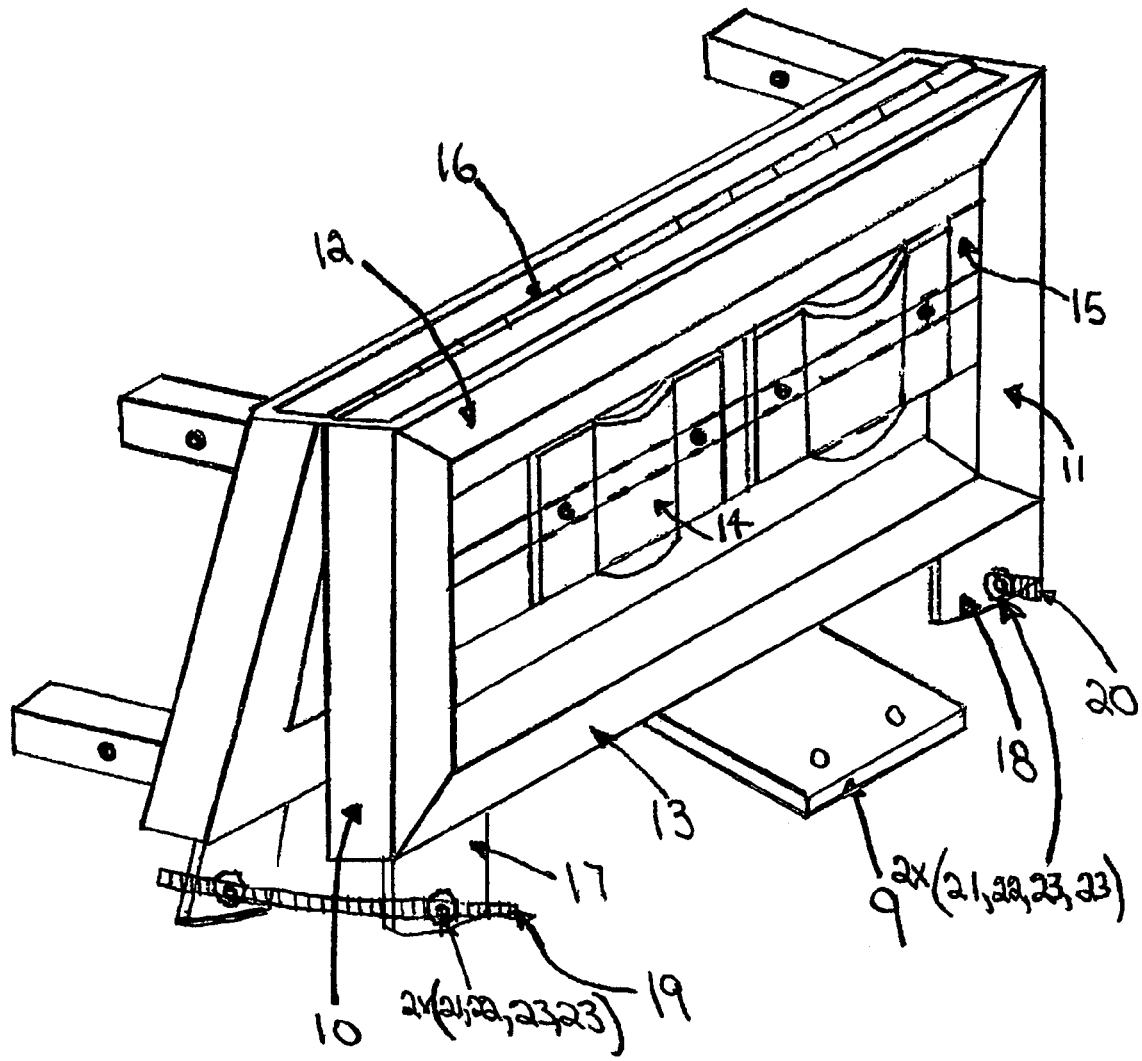

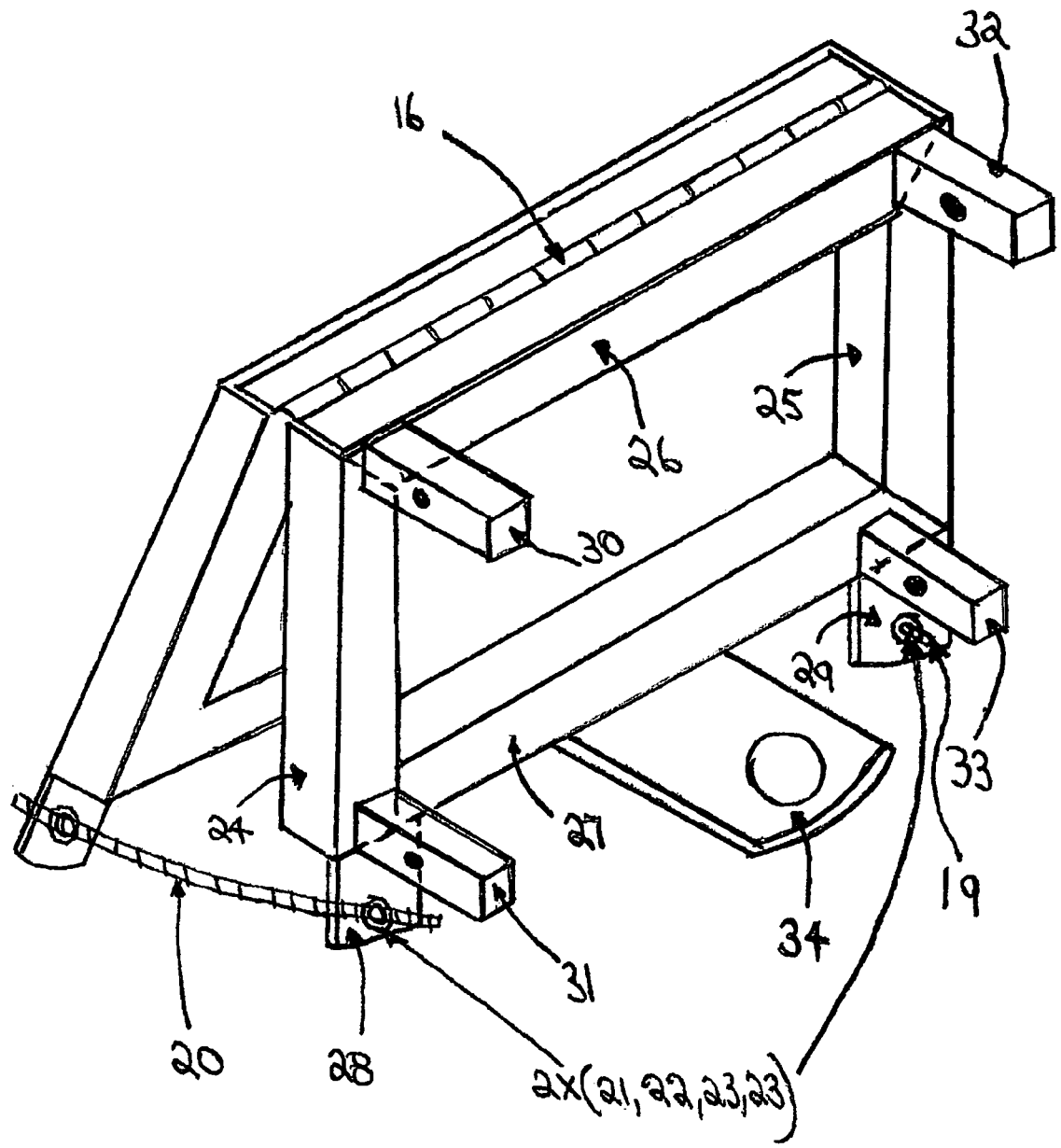

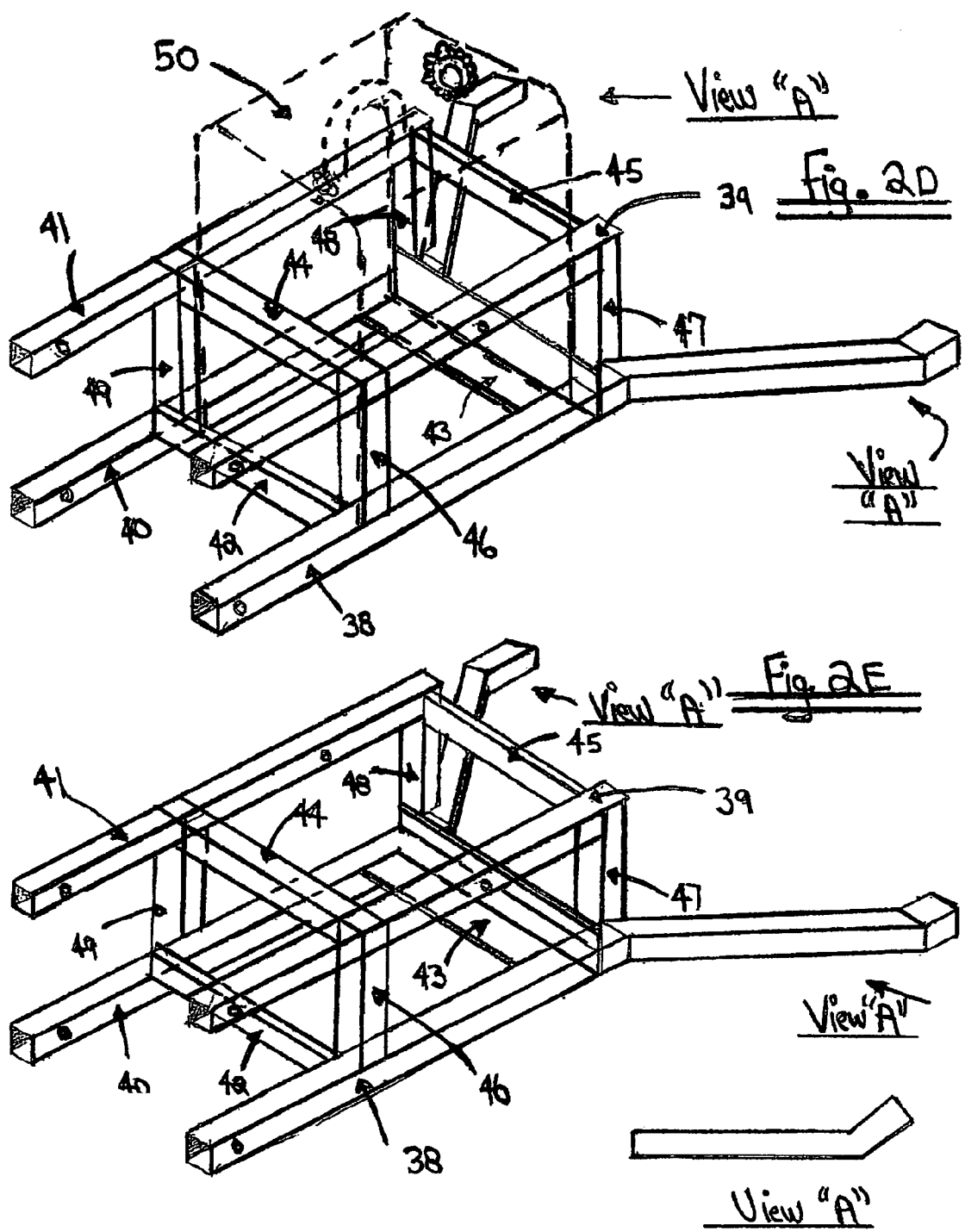

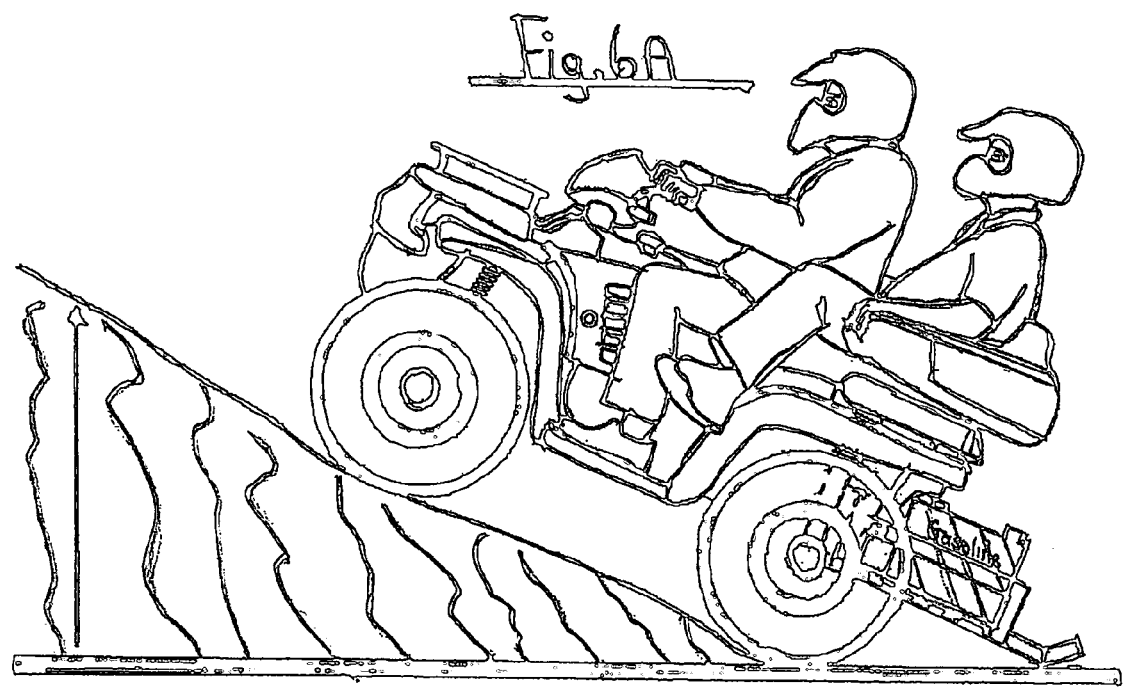
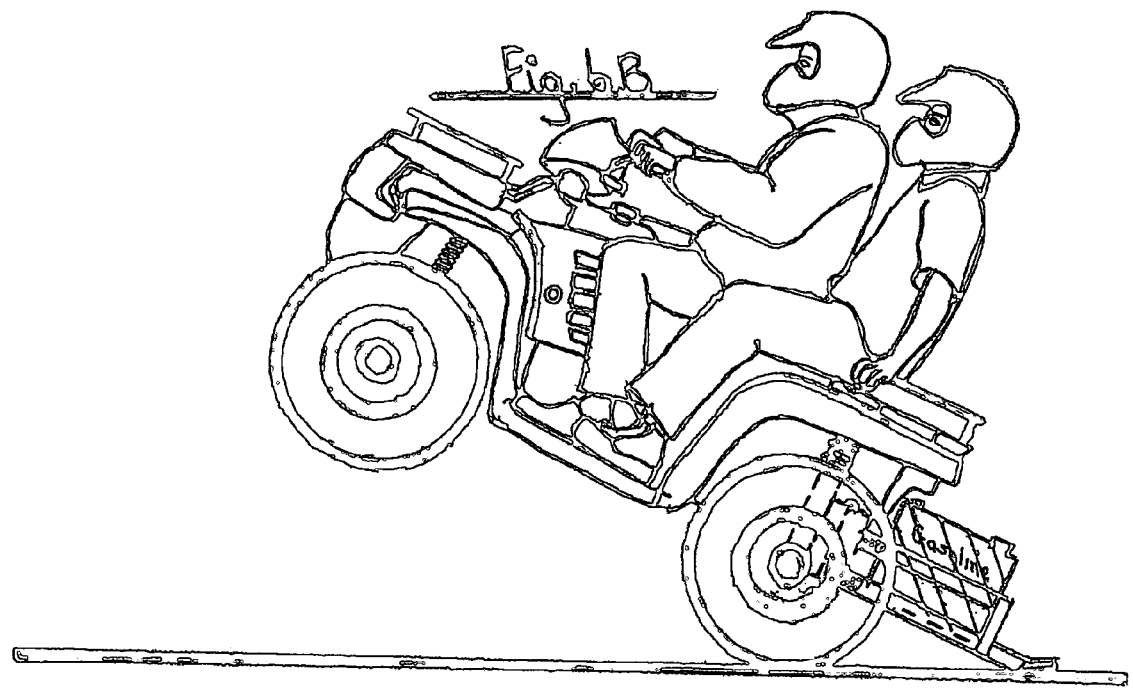

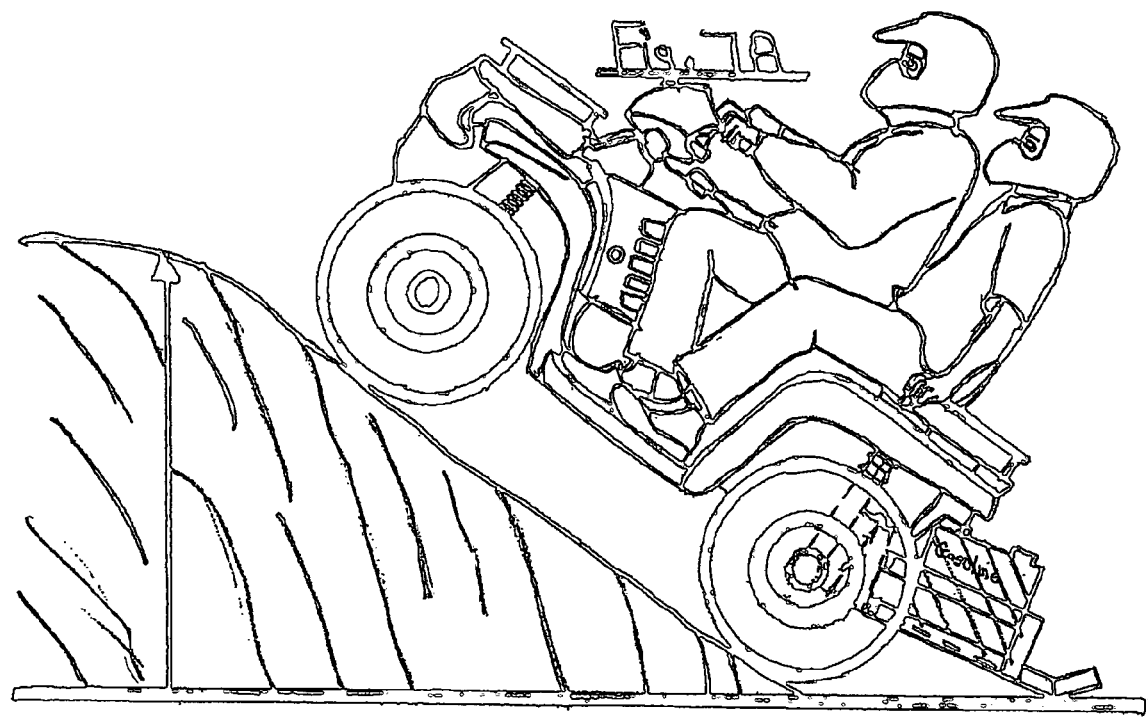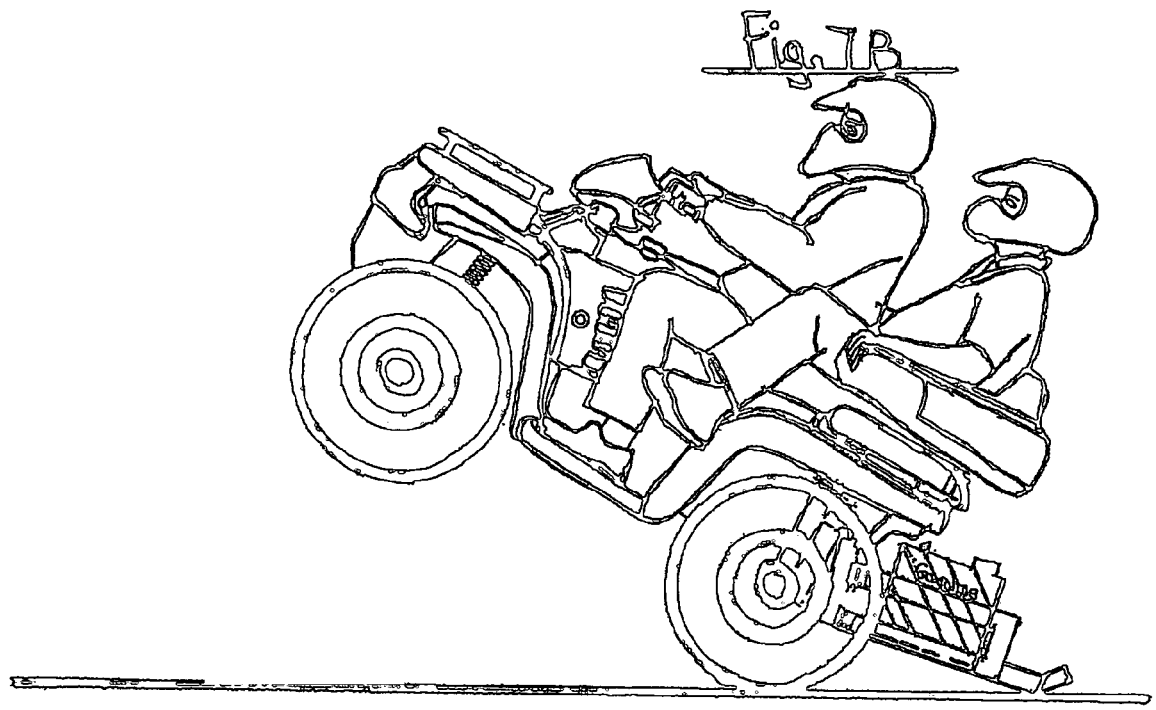

ALL TERRAIN VEHICLE (ATV) SAFETY ATTACHMENT WITH GAS TANK HOLDER

PROVISIONAL PATENT APPLICATION

This Invention claims the benefit of Provisional Patent Application No. 60/838,111 Filing date Aug. 17, 2006.

BACKGROUND OF THE INVENTION

This invention relates to All Terrain Vehicles, specifically to an improved safety attachment which does not allow the front end of the vehicle to leave the ground enough to cause a backwards overturn.

All terrain vehicles are becoming, if not already are, one of the most popular leisure activity vehicles on the market, be it for riding the trails for enjoying the outdoors or for hunting. ATVs are also gaining popularity in their ability to aid the transportation of workers for their employment, whether to the job site or in the work assigned.

ATVs are often ridden in isolated areas such as sand dunes, deserts, and mountain areas, and are operated by all ages, young children as well as adults even though there is usually a warning of: not to be operated unless 16 years of age or older.

If ATVs are used for recreation, there are vast amounts of trails, ATV enthusiasts are making their own trails and the terrain is not always smooth and flat. There are many mountainous trails and a lot of short up and down crevices in the trails which create a definite hazard to the riders. The power of the ATVs exceeds the weight of the vehicle and with this excessive power the front end of the ATV invariably lifts off the ground. In some cases a backward mishap occurs. When 1 person drives an ATV, that person is still at risk from the rugged terrain and also the power of the ATV. The experienced person uses his body weight to aid in the manoeuvring on difficult terrain, but there is still the unexpected and the terrain can change at such a rapid pace with the speed of the ATVs, an upset from the front end leaving the ground and the ATV flipping over backwards is sometimes unavoidable. ATVs are designed for one person; some people prefer one driver and one passenger, riding on the seat designed for one person. There are after market back seats that are sold to make the ride for the passenger more comfortable but these seats are pushed further back to the back wheel base to accommodate a passenger.

With the trails being steep and rugged, there is the risk of the ATV going over backwards causing serious if not fatal injury to the driver and passenger. A passenger on the back with an after market back seat, is at even more risk than a passenger doubling on the existing seat because, the passenger is even further to the back of the ATV making the front end even lighter when going up uneven terrain. The center of gravity is now moved close to the back wheels. There are now ATVs on the market designed for 2 riders, but these too can flip over backwards in certain terrain.

If ATVs are used for hunting, usually the terrain to get to the game is uncharted and often mountainous. There again is the danger of the front end lifting up too high and going over backwards when one or two people are on the ATV.

If ATVs are used for work, the danger is still present from the same problems that plague the leisure riders. There have been numerous accidents involving the ATVs front end lifting up too high off the ground and causing the ATV to go over baclwards seriously injuring or killing the driver and or passenger. If ATVs are used for work, in most instances only one person on one machine is permitted.

The problem this Invention solves was approached in the prior art and has been partially solved. The prior art does not limit how far the front end can leave the ground. Through research on this invention, in steep terrain with one or two people on the ATV, it was discovered that limiting how far the vehicles front end lifted off the ground, this was the factor in totally eliminating any threat of a backwards flip-over.

In the prior art of Kitner in U.S. Pat. No. 4,815,756 has attempted to solve the problem of a backwards flip-over with a vehicle stabilizer attachment and has a mounting bracket that attaches to the undercarriage of the ATV to which an outrigger spring is mounted at a forward angle. A rear spring extends from the vehicle in a similar manner. Stabilizer arms are attached to the outrigger springs and a cross bar is fastened to the rear spring providing an extended footprint capable of holding the weight of the vehicle. The cross bar also prevents the ATV from flipping over backwards when the front wheels of the ATV are lifted off the ground an outrigger attached from a spring that flexes when touching the ground. Furthermore, U.S. Pat. No. 6,425,510 B1, issued to King, which discloses a storage box apparatus for attachment to an ATV that also doubles as an anti-tipping device for the ATV. The storage box apparatus attachment serves the additional function of preventing the ATV from flipping over backwards and overturning via the bottom surfaces of the article carry channel, the carry channel lip, and the storage box unit.

On flat terrain the prior art may eliminate a backwards overturn but as the terrain becomes steeper and the front end of the ATV lifts up higher and threatens to go over backwards, the prior art of Kitner's cross bar acting as a extended footprint needs to be moved further behind the rear wheels. The combined center of gravity of the driver and a passenger, if a passenger is on the vehicle, is too close to the back wheels even with the added cross bar acting as an extended footprint, the ATV could go over backwards under extreme conditions. The prior art does not give wide spread stability if the ATV threatens to go over backwards on a angle. The trails are very uneven so this possibility is ever present.

As mentioned before, all terrain vehicles are becoming so popular in their usages, that these vehicles are used to the extreme in most instances, meaning they are being used in all sorts of terrain, they are being used by more than one person at a time and the power of these vehicles is becoming excessive.

In conclusion, combined with the steepness of the hill or terrain and the weight of one or two people on the all terrain vehicle and also the weight and the power of these vehicles, if the front end of the vehicle is allowed to lift too high off the ground in this kind of a situation, the possibility that the all terrain vehicle will have a backwards overturn is ever present.

SUMMARY OF THE INVENTION

The all terrain vehicles designed for one person are being used in all sorts of terrain and situations. When climbing a hill or incline, the center of gravity between the front wheel/s and the back wheels moves further back to the back wheels on the all terrain vehicle because of the incline of the hill and also with a person's body being slid further backwards or even worse when a passenger is on the back.

All terrain vehicles designed for two people are not at as much risk but as an incline or a steep hill are climbed the center of gravity is also moved further to the back wheels, whether from the driver and passenger sliding backwards or simply because of the steepness of the incline.

This safety attachment is for the prevention of the front wheels of an all terrain vehicle leaving the ground too far and avoiding a backwards overturn, is comprised of 2 pieces: an adjustable frame that is attached to the back end of an ATV and is meant to stay on permanently and a removable safety device which can be attached before use and detached after each use by the user or owner. A gasoline container can be carried within the housing of the safety device. Once the safety device is attached, the safety device is parallel with the ATV and the bottom of the safety device is in an approximate horizontal line with the center of the front and back wheels. The safety device clears the ground approximately the height of the radius of the wheels. The safety device can be adjusted upwards with an adjustment on the adjustable frame; this adjustment can be made manually or by mechanical means.

This adjustment on the safety device gives more clearance on the trails when climbing up and down short steep hills and also rough terrain. This adjustment can only be adjusted until a safe factor is reached and the safety attachment does its job, avoiding the ATVs front end from lifting off the ground too far.

It is an objective of the safety attachment, more particularly the safety device, which has been designed in length and width and height to stop the front end of the ATV from lifting too high off the ground not only from a straight backwards overturn but also when the ATV leaves the ground on a angle.

It is further an objective in the design of the bottom outer members on the safety device, they are bent outwards behind the housing compartment, for stability and the ends are bent up for two reasons; when the ATV is backing up, the bent up tips stop the safety device from digging into the ground and also when the front end of the ATV lifts off the ground, the bent up tips contact the ground and act as resting pads before the ATV drops back onto its wheel/s.

This safety attachment is innovative in its design because it does not stop the ATV only from having a backwards overturn, it eliminates the possibility of a overturn by limiting how far the front end lifts off the ground.

The safety attachment may be made of metal or some equivalent sturdy material. These advantages will become more apparent from the subsequent detailed description and from the drawings and the claims.

BRIEF DESCRIPTION OF THE DRAWINGS

FIG. 1A is a plan view of the safety attachment attached to the back end of a partial back end sketch of an ATV.

FIG. 1B is a plan view of the safety attachment c/w gasoline container, connected to the two upright pipes and center trailer hitch plate on the ATV.

FIG. 1C is an elevation view of the safety attachment c/w gasoline container, connected to the two upright pipes and the center trailer hitch plate on the ATV.

FIG. 2A is an isometric view of side A of the adjustable frame.

FIG. 2B is an isometric view of side A of the adjustable frame showing the connection plates that attach around the two vertical pipes on the ATV and then attach onto side A of the adjustable frame.

FIG. 2C is an isometric view of side B of the adjustable frame.

FIG. 2D is an isometric view of the safety device with a gasoline container placed within the housing.

FIG. 2E is an elevation view of the safety device.

FIG. 6A is a left side view of a driver and a passenger riding a conventional one-person ATV with an after market passenger seat with the safety attachment adjusted at the 0 position climbing up a fairly steep hill.

FIG. 6B is a left side view of a driver and a passenger riding a conventional one-person ATV. The extra person and the power of the ATV, lifts the front end off the ground on a fast take-off.

FIG. 7A is a left side view of a driver and a passenger riding a conventional one-person ATV with the safety attachment adjusted to its maximum safe open position. On the start of a steep hill, the ATV wants to flip up but the safety attachment stops the ATV from going over backwards.

FIG. 7B is a left side view of a driver and a passenger riding a conventional one-person ATV with an after market passenger seat with the safety attachment adjusted to its maximum safe open position. The extra person and the power of the ATV, lifts the front end off the ground on a fast take-off.

DETAILED DESCRIPTION OF THE INVENTION

Figure 2F:
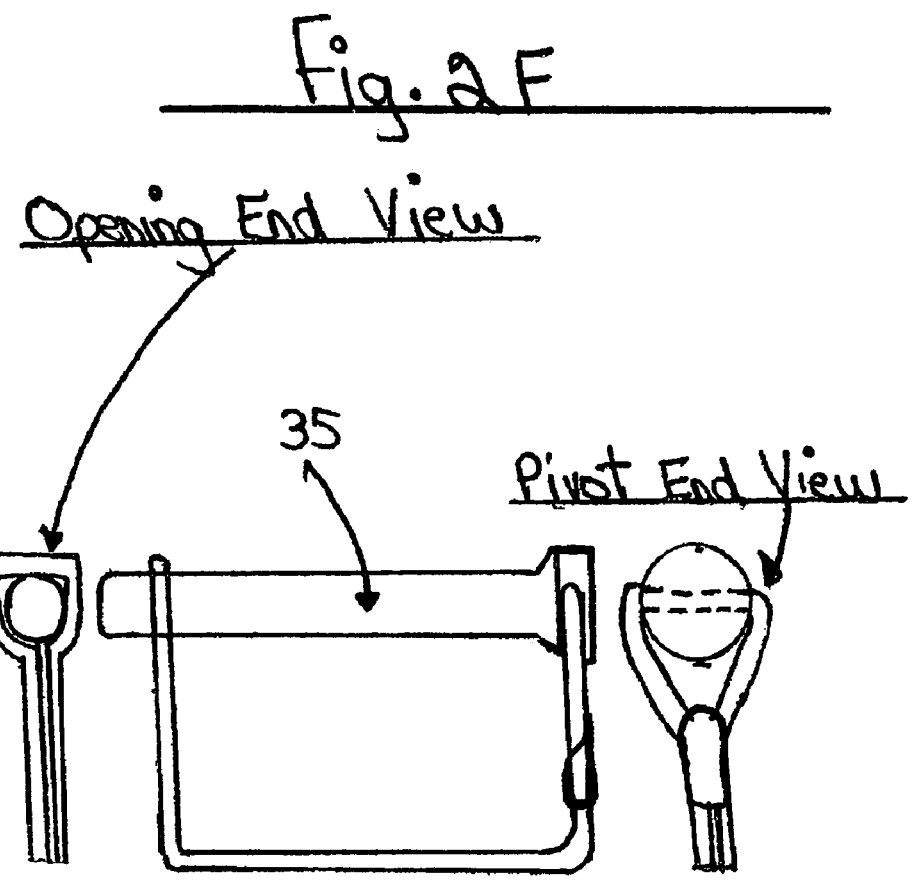
FIG. 2F is a side elevation view of the locking pins.
Figure 2G:
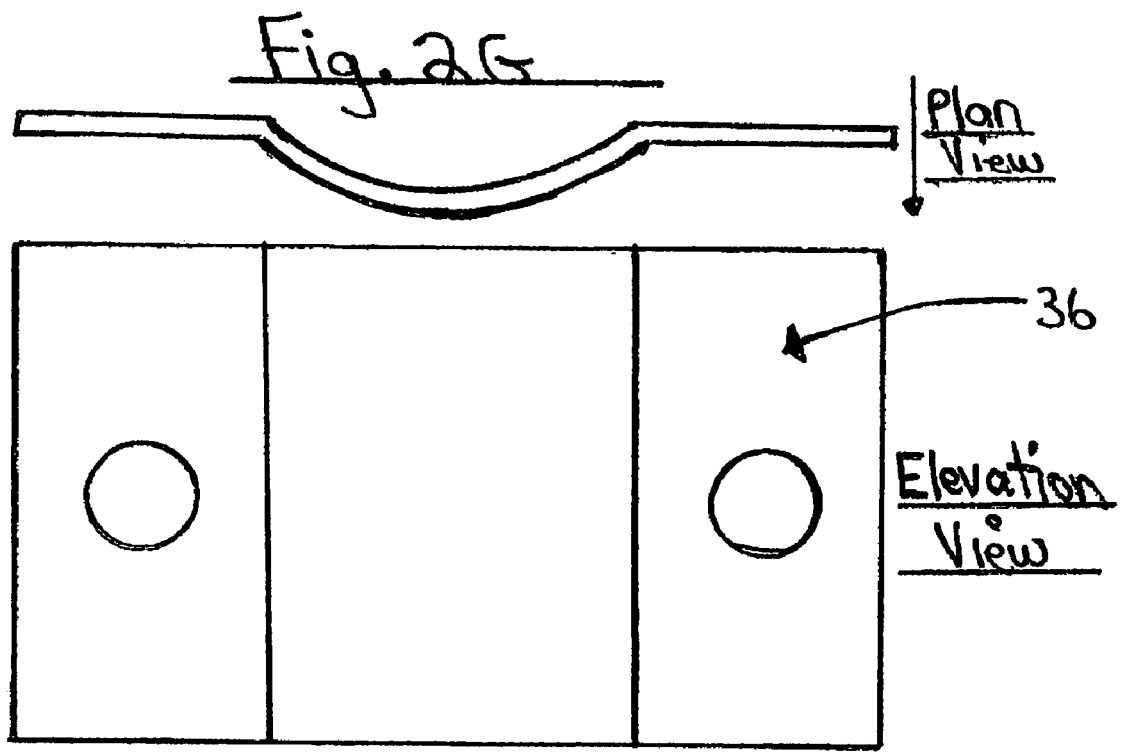
FIG. 2G is an elevation/plan view of the connection plates that attach around the two vertical pipes on the ATV and then attach onto side A of the adjustable frame.

FIG. 1A shows the plan view of the back end of a vehicle designated as 1. The vehicle 1 is generally referred to as an "all terrain vehicle". The vehicle has a pair of rear wheels 2 and 3 respectively; the front end of the vehicle is not shown but generally has one or two wheels. The rear wheels generally have an axle that runs from one wheel to the other wheel and the axle is enclosed within the axle housing. On some ATVs the rear wheels do not have a axle that runs from one wheel to the other wheel. The rear wheels are on separate axles that connect into the transmission independently. There are many makes and models of ATVs on the market and the back end designs change on a lot of these ATVs. I will describe in this detailed description of the invention, how to attach this safety attachment onto an ATV that has separate axles on the back end. There are two vertical pipes 4 and 5 that extend from the top of the lower frame on the ATV, then protrude vertically upwards and attach into the upper frame on the ATV. On the center of the lower frame on the ATV, a plate 6 is welded and this plate 6 has two holes drilled in it. This plate 6 is where the trailer hitch bracket is bolted on at the factory. To attach the safety attachment onto the back end of an ATV, firstly you remove the trailer hitch bracket that is bolted onto plate 6. This is one of the points where the adjustable frame 7 and 8 attaches to the ATV.

FIG. 2A shows side A of frame 7 of the adjustable frame, this frame 7 is made up of two vertical members 10 and 11, they are connected at the top and bottom corners at 45 degree angles by two horizontal members 12 and 13 also at 45 degree angles, by welding or by other means of connecting some equivalent sturdy material. Within this rectangular frame there are members 14 and 15 welded to the members 10 and 11. The members 14 and 15 are flush on either side with members 10 and 11. Members 14 and 15 are spaced apart enough to allow bolts to fit up between with some clearance allowance. As mentioned earlier, there are many makes and models of ATVs on the market, side A of frame 7 will require modifications to fit to the different makes and models of ATVs on the market.

FIG. 2A shows the bottom outer side of member 13, there is a plate 9 welded or bolted onto member 13, there are two holes in plate 9. These two holes in plate 9 will bolt onto the plate 6 on the back end of the ATV. A hinge 16 is welded or bolted to member 12 of frame 7 and also welded or bolted to member 26 of frame 8. The hinge 16 is welded or bolted on the top side to make one adjustable frame. On the bottom member 13 of frame 7, there are two plates 17 and 18, they are welded flush to the outer face on the outer ends on member 13, and a hole is drilled in each of these plates 17 and 18. The long curved threaded bolts 19 and 20 go through the one side of plates 17 and 18. On either side of plates 17 and 18 a flat washer 21, lock washer 22 and double nuts 23 are attached onto the long curved threaded bolts. As discussed in the claims, the long curved bolts are only one of the ways that the adjustable frame can be opened for more clearance on the trails or closed for less clearance on the trails.

FIG. 2C shows side B of frame 8, this frame 8 is made up of two vertical members 24 and 25, they are connected at the top and bottom corners at 45 degree angles by two horizontal members 26 and 27 also at 45 degree angles by welding or by other means of connecting some equivalent sturdy material. The hinge 16 is attached to member 26 on frame 8 and also on the corresponding member 12 on frame 7 by welding or bolting. On the bottom outer ends of member 27, there are two plates 28 and 29, these members 28 and 29 are attached by welding and a hole is drilled in each of these plates to fit the long curved bolts 19 and 20. The long curved threaded bolts 19 and 20 go through the one side of plates 28 and 29 and on either side of plates 28 and 29 there is a flat washer 21, lock washer 22 and double nuts 23. Also on member 27 on the bottom and in the center, there is a plate 34 with a hole drilled in it of sufficient size to fit a trailer hitch ball. This plate 34 is welded securely to member 27. Once the adjustable frame is attached to the ATV, plate 34 will be the new location to attach a ball for a trailer hitch when the ATV is pulling a load. There are four connection members 30,31,32,33 that are welded at a perpendicular angle at the four intersection points of members 25 to 26, 26 to 24, 24 to 27 and 27 to 25. A hole is drilled in each of the four connection members 30,31,32,33. FIG. 1A, FIG. 1B and FIG. 1C show how the safety device 37 slides onto these four connection members 30,31,32,33. FIG. 2F shows a locking pin 35, in FIG. 1A, FIG. 1B and FIG. 1C a locking pin 35 is inserted through the safety device and through the four connection members on frame 8 on FIG. 2C.

FIG. 2A, FIG. 2B and FIG. 2C shows both sides of the adjustable frame. This adjustable frame 7 and 8 is now ready to attach to the ATV.

FIG. 1A, FIG. 1B and FIG. 1C show how side A of the adjustable frame 7 is put onto the back end of the ATV, plate 6 on the ATV bolts onto plate 9 on frame 7 in FIG. 2A. FIG. 1A, FIG. 1B and FIG. 1C show how plates 36 wrap around the vertical pipes 4 and 5 on the ATV. There are four bolts that go between members 14 and 15 in FIG. 2A and also FIG. 2B. FIG. 2B shows how the two plates 36 bolt onto side A of frame 7. In FIG. 2B, plates 36 are shown for clarity purposes bolted onto the back side of side A of frame 7. Once plate 9 of the adjustable frame 7 and 8 have been attached to the back end of the plate 6 on the ATV and the two plates 36 have been bolted around the two vertical pipes 4 and 5 on the ATV and secured to frame 7, the adjustable frame 7 and 8 is secured and ready to attach the safety device 37.

FIG. 1A, FIG. 1B and FIG. 1C show how the safety device 37 attaches onto side B of frame 8 and how the locking pins 35 are inserted through to hold the safety device 37 onto the adjustable frame 7 and 8.

FIG. 2D shows the safety device 37 with a gasoline container 50 housed within its frame.

FIG. 2E shows the safety device 37. This safety device 37 is made up of two bottom members 38 and 40. These members 38 and 40 are made into left/right hand pieces. Member 38 just behind vertical member 47 is bevel cut so member 38 moves to the right at a sharp angle and on the very end, member 38 is bevelled and moves to the left, so it again becomes parallel with itself where the gasoline container is housed and also the very end of member 38 is bevelled upwards. View "A" on FIG. 2D and FIG. 2E show the upwards bevel of member 38 on the back end. Member 40 is bevelled the opposite way behind member 48, it moves to the left at a sharp angle and on the very end, member 40 is bevelled and moves to the right, so it again becomes parallel with itself where the gasoline container is housed and also the very end of the member 40 is bevelled upwards. View "A" on FIG. 2D and FIG. 2E show the upwards bevel of member 40 on the back end. These bevelled pieces 38 and 40 are welded fully. If these members 38 and 40 are formed no welding will be required. If these members 38 and 40 are made of some equivalent sturdy material, then the procedure to attach this material is followed. These bent members 38 and 40 that are bent to the right and the left serve the purpose of stability if the ATV was to have a backward mishap. The bent up members on the ends 38 and 40 serve two purposes; when the ATV is backing up, the bent up tips stop the safety device from digging into the ground and also when the front end of the ATV lifts off the ground, the bent up tips contact the ground and act as resting pads before the ATV drops back onto its wheel/s. A hole is drilled in each of the members 38 and 40 on the opposite end of the bent up tips, the locking pins 35 go through these holes. Member 39 is bevelled at a 45 degree angle on the back end and the front end is cut square and a hole is drilled through the member 39, the locking pin 35 goes through this hole. Member 39 also has a hole drilled through it, in approximately the center of the compartment to carry the gasoline container. This hole is used to tie the gasoline container within the housing. Member 47 is bevelled at a 45 degree angle at the top end and cut square at the bottom end. Member 46 is cut square on both ends. Members 38, 46, 39 and 47 are fitted together to make one side of the safety device. Members 38, 46, 39 and 47 are again welded fully and if made of some equivalent sturdy material, then the procedure to attach this material are followed. The other side of the safety device is built similar to the first side. Member 41 is bevelled at a 45 degree angle on the back end and the front end is cut square and a hole is drilled through the member 41. The locking pin 35 goes through this hole. Member 41 is similar to member 39; it has a hole drilled through it, in approximately the center of the compartment. This hole is used to tie the other end of the mechanism to hold the gasoline container within the safety device housing. Member 48 is bevelled at a 45 degree angle at the top end and cut square at the bottom end. Member 49 is cut square on both ends. Members 40, 41, 48 and 49 are fitted together to make another side of the safety device. These members are again welded (or if made of some equivalent sturdy material, then the procedure to attach this material are followed.) Both sides of the safety device are brought together and tied together by four members, members 42, 43, 44, 45.

Members 42 and 43 are made of an angular material; the inner legs face each other. These two inner legs on members 42 and 43, act as a shelf to carry the bottom of the gasoline container 50. Each end of these members 42 and 43 are attached to either side of the safety device by welding. Member 44 is made of an angular material, the inner leg faces horizontal and forward towards the back end of the ATV and the other leg is vertical on the inside of the compartment to carry the gasoline container 50. Member 45 is made of a flat piece of material that is attached to either side of safety device. This safety device is now complete and ready for use.

FIG. 1A, FIG. 1B and FIG. 1C show how the safety device 37 attaches to the side B of frame 8 of the adjustable frame. The locking pins 35 are inserted through the four locations on the safety device 37 to the adjustable frame, side B of frame 8. The driver and/or passenger are ready to ride the trails. Before riding the trails an understanding of how to adjust the safety attachment will be explained.

FIG. 2C shows the long curved threaded bolts 19 and 20 with flat washer 21 and lock washer 22 and double nuts 23. To adjust the adjustable frame 7 and 8, the double nuts 23 are loosened from the outside of plates 28 and 29 on frame 8. These double nuts 23 are backed off a certain distance. The double nuts 23 on the inside of frame 8 on plates 28 and 29 are loosened off, and then one by one the double nuts 23 are tightened up until the desired adjustment. Once the desired adjustment is reached, the nuts on both sides of plates 28 and 29 are tightened. The double nuts 23 on frame 7 do not need to be adjusted.

The adjustment is now complete and you are ready to ride the trails.

Figure 3A:
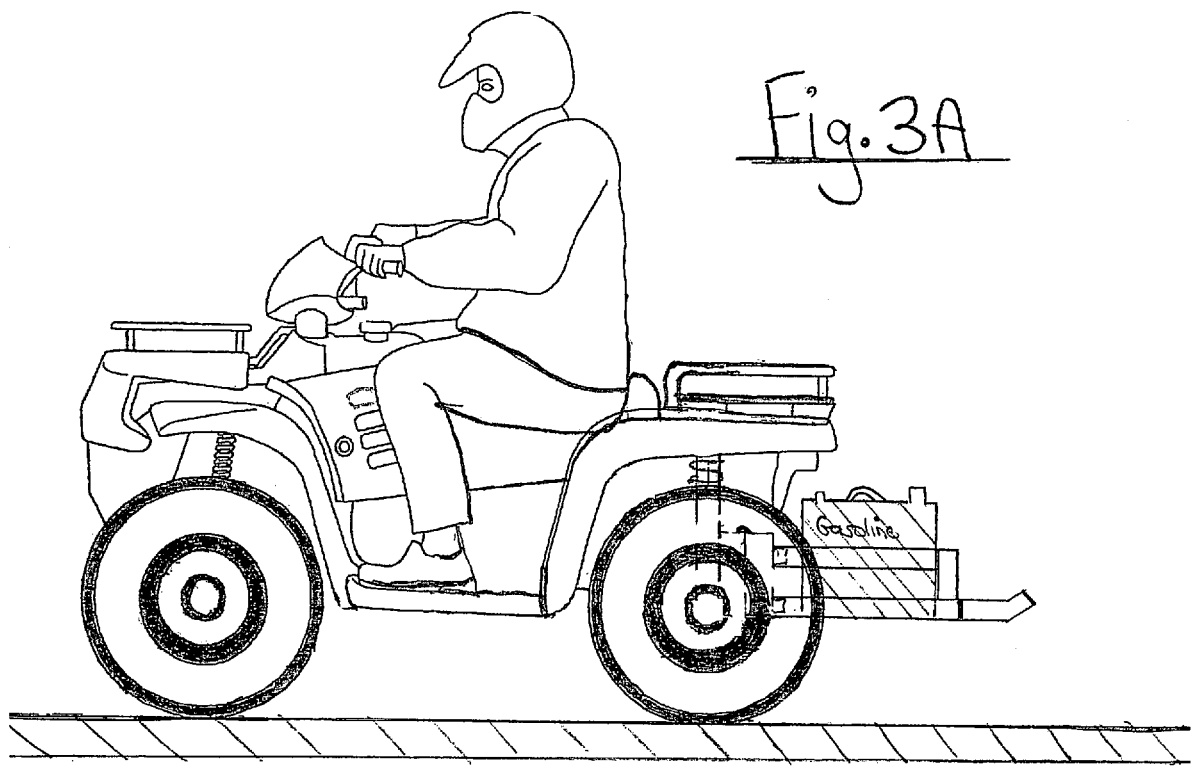
FIG. 3A is a left side view of one person riding a conventional one-person ATV with the safety attachment attached and the adjustable frame adjusted to its 0 position.

FIG. 3A shows a conventional one person ATV but this could also be a 2 person ATV driven by one person on a flat surface. The safety attachment is attached and adjusted to its closed position for flat ground. With the safety attachment on the back of the ATV, if the front end lifted off the ground too high for any reason, the driver would be protected from the ATV going over backwards.

Figure 3B:
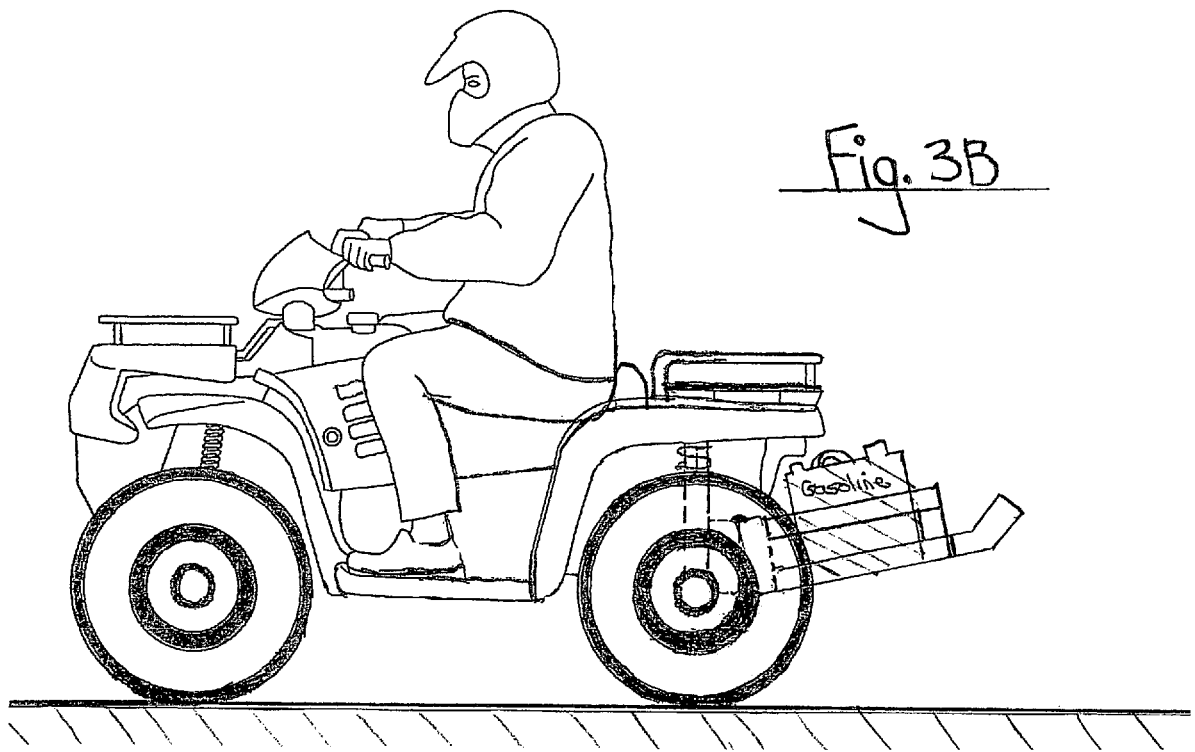
FIG. 3B is a left side view of one person riding a conventional one-person ATV with the safety attachment attached and the adjustable frame adjusted to it's maximum safe open position.

FIG. 3B shows a conventional one person ATV but this could also be a 2 person ATV driven by one person on a flat surface. The safety attachment is attached and adjusted to its fully open position. If the front end lifts off the ground for any reason the driver will be protected from a backwards flip over. If the terrain begins to get rough or hilly, the safety attachment will not touch on the terrain.

Figure 4A:
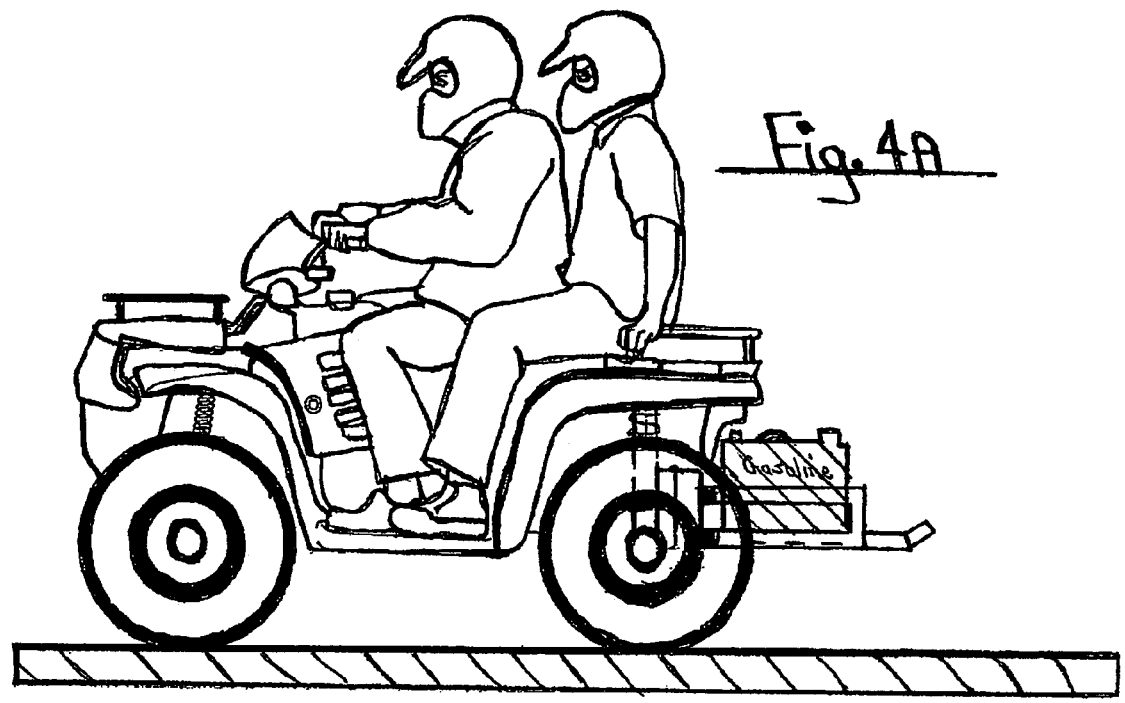
FIG. 4A is a left side view of a driver and a passenger riding a conventional one-person ATV with safety attachment attached and the adjustable frame adjusted to its 0 position.

FIG. 4A shows a driver and a passenger riding a conventional ATV, the center of the passenger's body is almost right over top of the center of the back wheels. The safety attachment is adjusted to its closed position and the terrain is flat. If the ATV encounters any uneven terrain that could result in an overturn of the ATV, the safety attachment will keep the driver and the passenger safe. If this vehicle was a two person ATV, the passenger would sit a lot further forward away from the center of the rear wheels but still a mishap could occur if the terrain changes from flat to hilly. That is why the safety attachment could aid the two person ATV.

Figure 4B:
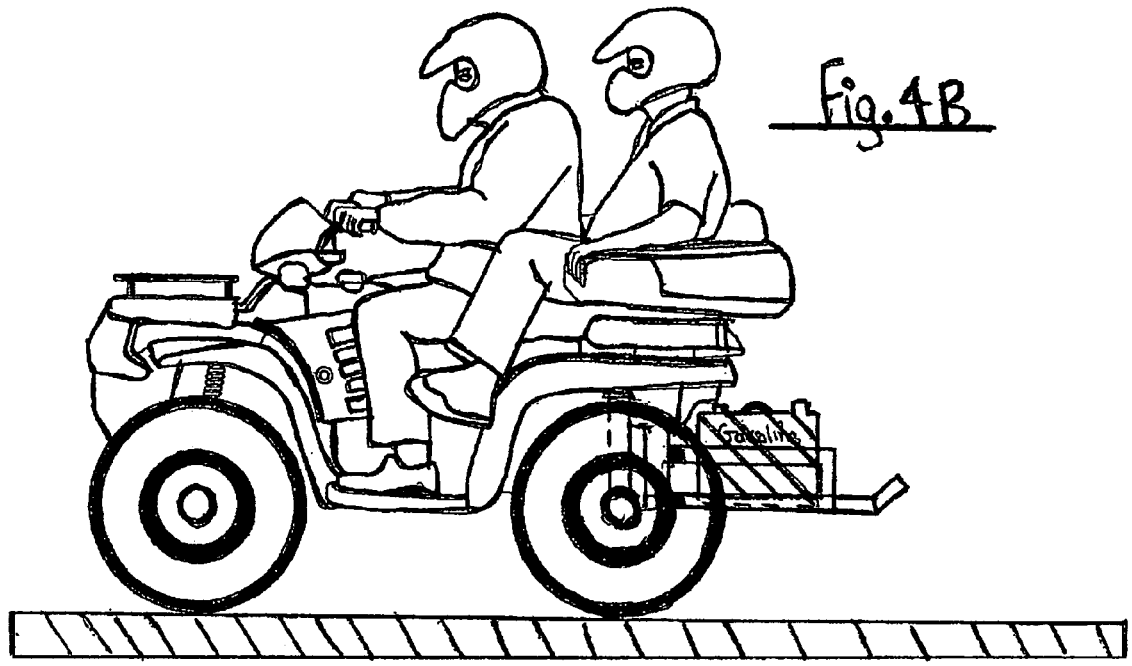
FIG. 4B is a left side view of a driver and a passenger riding a conventional one-person ATV with an after market passenger seat with the safety attachment attached and the adjustable frame adjusted to its 0 position.

FIG. 4B shows a driver and a passenger riding a conventional ATV with an after market back seat. The passenger's center of his body is past the center of the rear wheels resulting in the front end being a lot lighter than doubling without a after market back seat. Without the safety attachment on the attached to the ATV a mishap is inevitable once the ATV leaves flat terrain.

Figure 5A:
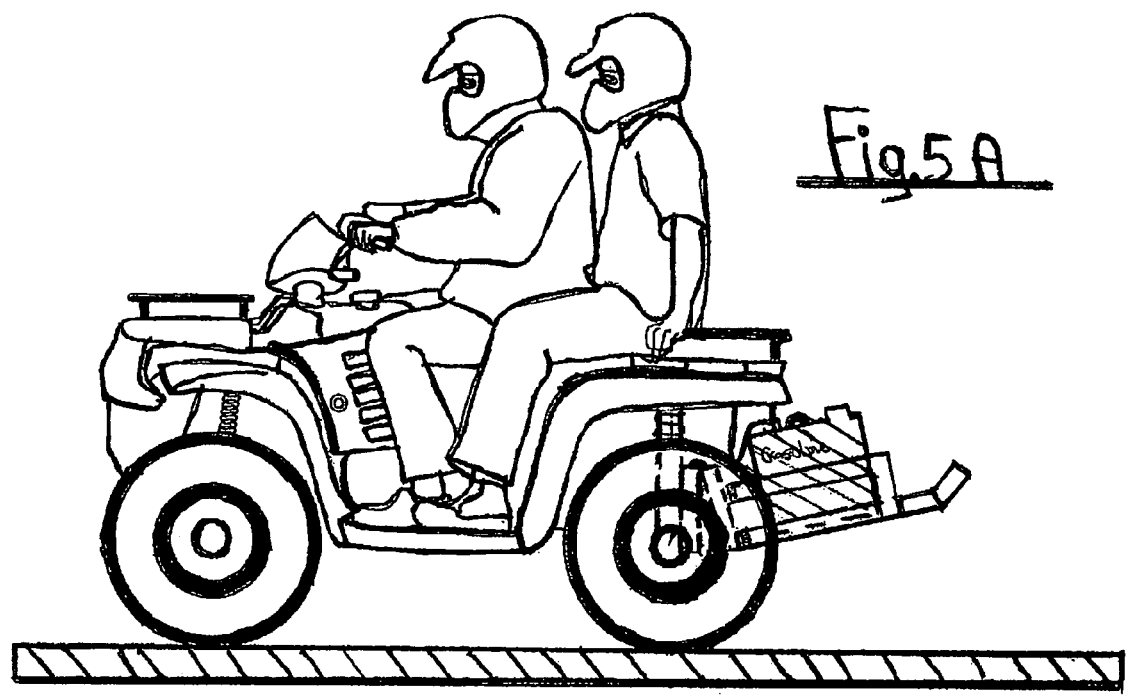
FIG. 5A is a left side view of a driver and a passenger riding a conventional one-person ATV with the safety attachment attached and the adjustable frame adjusted to its maximum safe open position.
Figure 5B:
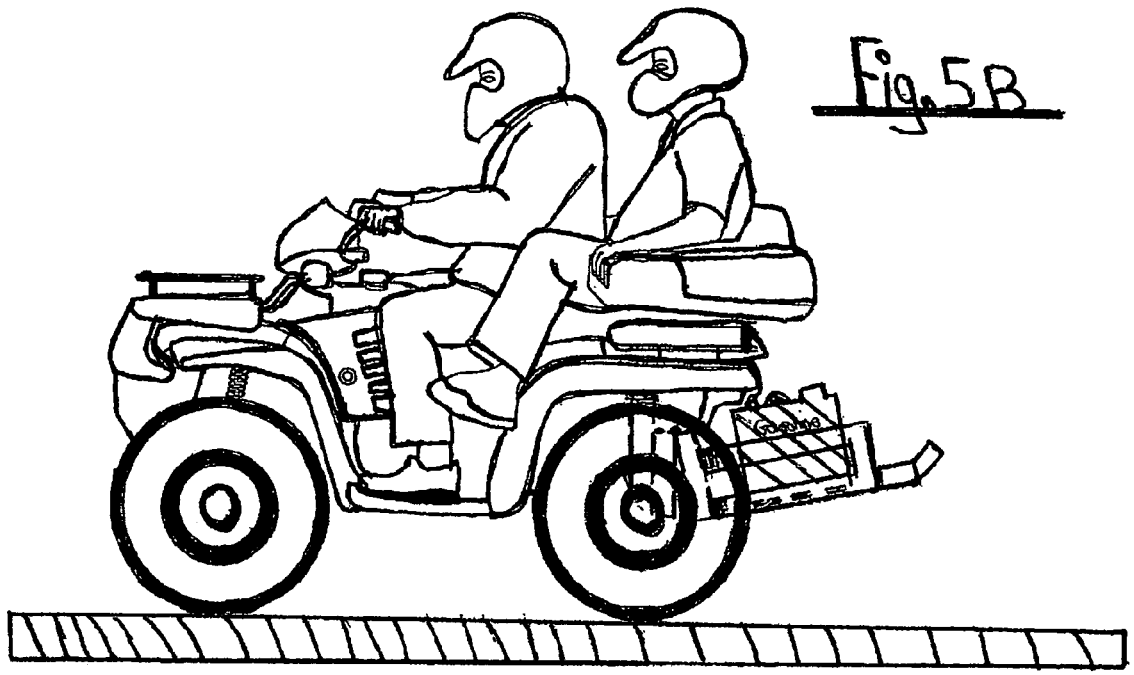
FIG. 5B is a left side view of a driver and a passenger riding a conventional one-person ATV with an after market passenger seat with the safety attachment attached and the adjustable frame adjusted to its maximum safe open position.

FIG. 5A and FIG. 5B are similar to the previous FIG. 4A and FIG. 4B except the safety attachment is adjusted to its fully open position.

FIG. 6A shows a driver and a passenger riding a conventional one-person ATV with an after market back seat with the safety attachment in its closed position climbing a reasonable incline. Sudden changes on the incline could result in an overturn. Also backing down an incline and slamming on the brakes in this situation shown, could cause the front end to lift off the ground and without the safety attachment on the ATV, a backwards mishap would occur.

FIG. 6B shows a driver and a passenger riding a conventional one-person ATV with the safety attachment in the closed position. The terrain is flat but accelerating too fast could cause the front end to lift off the ground and a mishap would occur without the safety attachment.

FIG. 7A shows a driver and a passenger riding a conventional one-person ATV with the safety attachment in the fully open position and the terrain has a steep incline and without the safety attachment in place a mishap is inevitable. It shows the tips of the safety device just touching the ground when going up a steep incline. Once the ATV starts climbing the steep incline, the tips of the safety device will clear the ground, unless there is a sudden change in incline and the front end lifts off the ground and again the safety attachment tips are required.

FIG. 7B shows a driver and a passenger riding a conventional one-person ATV with an after market back seat with the safety attachment in it's fully open position. The center of the passenger's body is behind the center of the rear wheels and the front end of the ATV is somewhat lighter, the ATVs power is too much for the weight of the ATV and the front end lifts off the ground and a mishap would be forth coming, but the tips on the safety attachment contact the ground and force the front end back onto its front wheel(s).

I claim:

1. An all terrain wheeled vehicle (ATV) safety attachment for preventing the front end of said vehicle from lifting too high off the ground and thus eliminating any chance of a backwards overturn, the safety attachment comprising:
   a) Two frames, a side A and a side B that are connected into one adjustable frame by a hinge member on the top and an adjustment on the bottom, said side A of said adjustable frame is permanently attached to the back end of said vehicle, and
   b) A removable safety device which attaches to said side B of said adjustable frame,
   c) Vertical mounting plates sandwiching said adjustable frame to the said vehicle and
   d) Four locking pins, connecting said adjustable frame to said removalable safety device.

2. The safety attachment as claimed in claim 1, wherein said adjustable frame is made of metal, having sufficient structural integrity to support said vehicle when bearing upon said safety device.

3. The safety attachment as claimed in claim 2, wherein said adjustable frame is made of two separate frames, said side A and said side B, that are connected by said hinge member at the top of said frames, and at the bottom of said frames there is an adjustment to allow said two frames to move apart and together.

4. The safety attachment as claimed in claim 3, wherein said hinge is attached to the top members of said two frames by welding or by bolting.

5. The safety attachment as claimed in claim 3, wherein an adjustment at the bottom of said frames, moves said two frames apart.

6. The safety attachment as claimed in claim 5, wherein said adjustment is be made by a pair of long curved studs, containing double nuts and washers.

7. The safety attachment as claimed in claim 6, wherein on the bottom of the underside of said frames, on the two outer corners, there are two separate pieces of steel plates welded onto each said frame; said pieces of steel plates have a hole drilled in the center of them; within these holes, said long curved bolts are fitted and allow said frame to adjust from 0 degrees to a safe maximum degree apart.

8. The safety attachment as claimed in claim 3, wherein said side A is made rectangular with an outer frame, two horizontal members and two vertical members, there are also two more horizontal members that are spaced apart within said rectangular outer frame; between said two horizontal members bolts are used with said vertical mounting plates to sandwich said side A of said adjustable frame to the said ATV.

9. The safety attachment as claimed in claim 8, wherein a steel plate is welded onto a bottom member on said side A of said adjustable frame, said steel plate extends at a 90 degree angle from said adjustable frame, holes are drilled in said plate and attach to a bracket on said ATV.

10. The safety attachment as claimed in claim 3, wherein said side B frame is rectangular with hollow steel outer frame, two horizontal members and two vertical members, further comprising four steel connection members welded on the four outer corners perpendicular to said side B frame, a hole is drilled in each said connection member.

11. The safety attachment as claimed in claim 10, further comprising a steel plate welded in the center on the underside of the bottom member of side B extending outwards, said plate has a hole drilled in it to attach a trailer hitch ball.

12. The Safety Attachment in claim 1, wherein said mounting plates are curved with two holes in each piece, said mounting plates sandwich said adjustable frame onto said ATV.

13. The safety attachment as claimed in claim 1, wherein said device is made of metal, having sufficient integrity to support said vehicle when bearing upon said safety device.

14. The safety attachment as claimed in claim 13, wherein the height, width and the length of said safety device, extend further back from said ATV a predetermined distance.

15. The safety attachment as claimed in claim 14, wherein the bottom members of said safety device are bent outwards, making left and right bottom members.

16. The safety attachment as claimed in claim 15, wherein said bottom members are bent upwards on the ends.

17. The safety attachment as claimed in claim 13, wherein the safety device further comprises four members with a hole drilled in each said member that connect onto said side B of said adjustable frame on said safety device and are secured by said locking pins.

18. The safety attachment as claimed e in claim 13, wherein within the body of said safety device a compartment with members on four sides and two members on the bottom forming a shelf to carry a container of gasoline.

* * * * *